(12) United States Patent
Zises

(10) Patent No.: US 10,275,825 B2
(45) Date of Patent: Apr. 30, 2019

(54) AUGMENTED REALITY IN-STORE PRODUCT DETECTION SYSTEM

(71) Applicant: PayPal, Inc., San Jose, CA (US)

(72) Inventor: Matthew Scott Zises, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 18 days.

(21) Appl. No.: 13/693,126

(22) Filed: Dec. 4, 2012

(65) Prior Publication Data

US 2014/0156459 A1 Jun. 5, 2014

(51) Int. Cl.
G06Q 30/00 (2012.01)
G06Q 30/06 (2012.01)

(52) U.S. Cl.
CPC ..... *G06Q 30/0643* (2013.01); *G06Q 30/0623* (2013.01); *G06Q 30/0641* (2013.01)

(58) Field of Classification Search
CPC .............. G06Q 30/00; G06Q 30/0601; G06Q 30/0631; G06Q 30/0641; G06Q 30/0643
See application file for complete search history.

(56) References Cited

U.S. PATENT DOCUMENTS

| | | | |
|---|---|---|---|
| 2003/0158796 A1* | 8/2003 | Balent | G06Q 10/087 705/28 |
| 2008/0226119 A1* | 9/2008 | Candelore | G06F 17/30256 382/100 |
| 2008/0279481 A1* | 11/2008 | Ando | G06F 17/30277 382/306 |
| 2009/0063307 A1* | 3/2009 | Groenovelt | G06Q 10/087 705/28 |
| 2009/0128335 A1* | 5/2009 | Leung | G06Q 30/02 340/572.1 |
| 2009/0182499 A1 | 7/2009 | Bravo | |
| 2010/0046842 A1* | 2/2010 | Conwell | G06F 17/30265 382/218 |
| 2011/0246064 A1* | 10/2011 | Nicholson | G01C 21/00 701/467 |
| 2011/0246330 A1 | 10/2011 | Tikku et al. | |
| 2012/0062596 A1 | 3/2012 | Bedi et al. | |
| 2012/0233070 A1 | 9/2012 | Calman et al. | |
| 2013/0179303 A1* | 7/2013 | Petrou | G06Q 30/06 705/26.61 |

(Continued)

FOREIGN PATENT DOCUMENTS

WO WO-2014089245 A1 6/2014

OTHER PUBLICATIONS

Brynjolfsson, Erik, Yu Jeffrey Hu, and Mohammad S. Rahman. Competing in the age of omnichannel retailing. MIT, 2013. (Year: 2013).*

(Continued)

*Primary Examiner* — Christopher B Seibert
(74) *Attorney, Agent, or Firm* — Maschoff Brennan

(57) ABSTRACT

A method and system create, on a portable electronic device, a real-time graphical view of an in-store product display that pinpoints the location of one or more target products on the product display. The graphical view is generated by capturing merchandise display data, such as a video feed of the in-store product display, and processing the data to detect the one or more target products based on predefined product recognition criteria uniquely associated with the respective target products.

22 Claims, 7 Drawing Sheets

(56) References Cited

U.S. PATENT DOCUMENTS

| | | | | |
|---|---|---|---|---|
| 2014/0152847 A1* | 6/2014 | Zomet | ................ | G06Q 30/0629 |
| | | | | 348/207.1 |
| 2014/0171116 A1* | 6/2014 | LaMarca | ................. | H04W 4/02 |
| | | | | 455/456.3 |
| 2014/0342754 A1* | 11/2014 | Liu | ....................... | H04W 4/023 |
| | | | | 455/456.2 |
| 2018/0109338 A1* | 4/2018 | Walden | .................... | G06T 7/70 |

OTHER PUBLICATIONS

"International Application Serial No. PCT/US2013/073193, International Search Report dated Apr. 18, 2014", 2 pgs.

"International Application Serial No. PCT/US2013/073193, Written Opinion dated Apr. 18, 2014", 5 pgs.

Takahashi, Dean, "IBM launches augmented reality app for grocery stores", VB News, [Online] retrieved from the internet: <http://venturebeat.com/2012/07/01/ibm-launches-augmented-reality-shopping-app/>, [Retrieved on; Mar. 29, 2014], (Jul. 1, 2012), 6 pgs.

\* cited by examiner

US 10,275,825 B2

AUGMENTED REALITY IN-STORE PRODUCT DETECTION SYSTEM

TECHNICAL FIELD

Example embodiments of the present application generally relate to data processing techniques. More specifically, the disclosure describes a technique for automated detection of one or more target products in a brick-and-mortar store where a customer is physically present.

BACKGROUND

Shoppers sometimes find it difficult to find particular products in a physical brick-and-mortar sales outlets, such as retail stores. It is a feature of modern-day stores, particularly retail stores such as supermarkets and hypermarkets, that a vast variety of products and product variants are offered, typically provided by a multitude of different brands and in different quantities/sizes.

In stores where products are provided for customer-collection on in-store displays (e.g., on display shelving that flank shopping aisles), shoppers in general, and sporadic shoppers in particular, struggle to identify particular products on their shopping lists among the many available products that are simultaneously visible.

In this disclosure, "store" means a real-world establishment where merchandise is sold, usually at a retail basis. "In-store" refers to something or someone being physically present at customer/merchandise interface where merchandise products are displayed or presented for collection by shoppers, regardless of whether or not the product display is indoors. An "in-store product display" may thus include an outdoor stall (e.g., at a mall or a fleamarket), and may also include outdoor portions of the relevant store (e.g., a gardening section of a supermarket).

BRIEF DESCRIPTION OF THE DRAWINGS

Various features of the disclosure are illustrated by way of example, and not by way of limitation, in the figures of the accompanying drawings in which.

DETAILED DESCRIPTION

An example embodiment of the present disclosure describes data processing techniques that comprises automatically recognizing a product of interest in an image captured by a mobile electronic device in a store, and displaying on a screen of a mobile electronic device an augmented view of the image in which the product of interest is highlighted or pinpointed.

Figure 1:
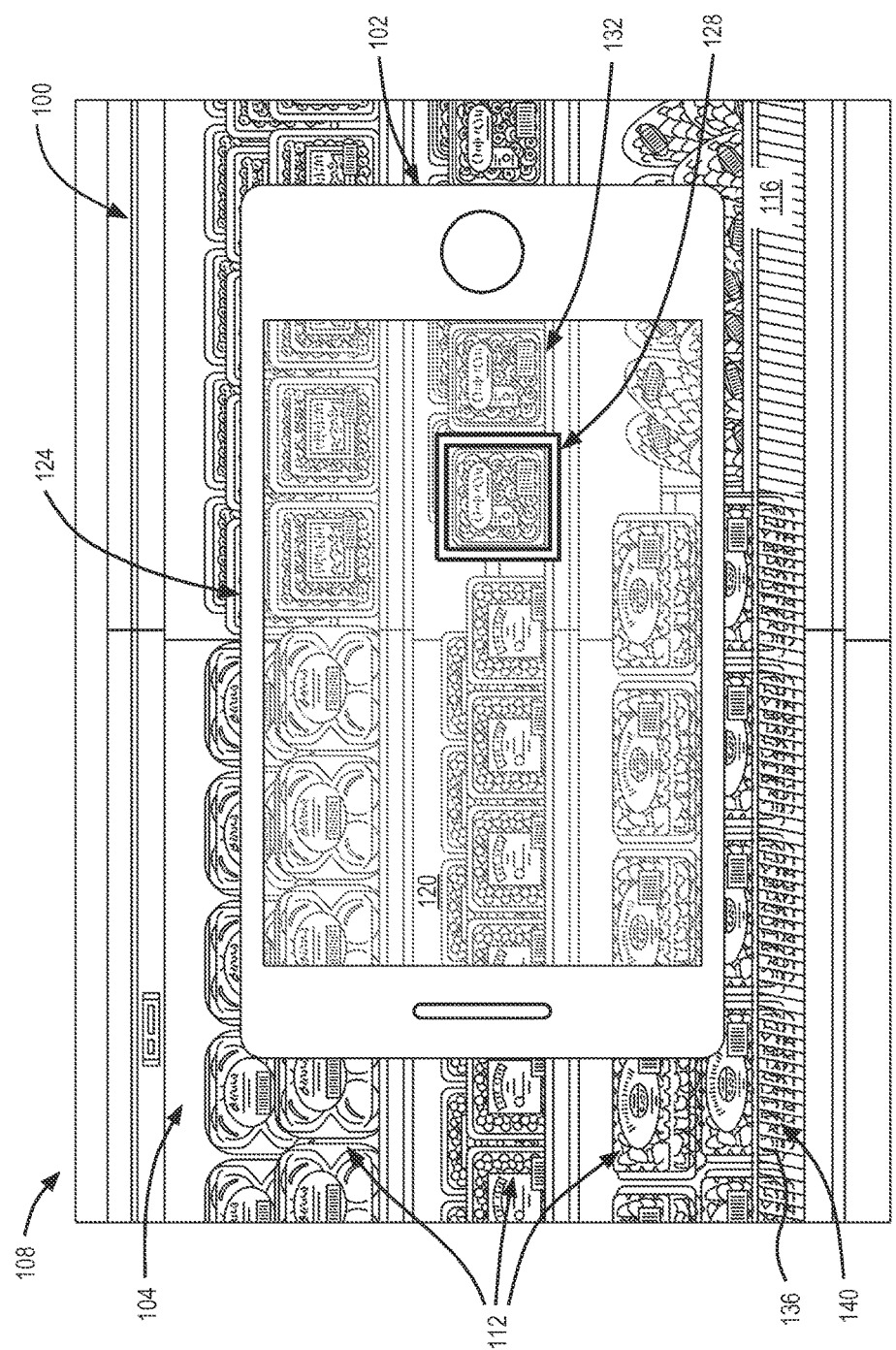
FIG. 1 is a schematic view illustrating an example embodiment of a portable electronic device configured to provide automated in-store product detection.

FIG. 1 is a schematic view of an example in-store product detection system 100 comprising a portable electronic device in the example form of a mobile phone 102 having hardware and software components that enable it to facilitate in-store discovery of one or more target products. FIG. 1 also shows an example in-store product display 104 of a retail outlet in the example form of a hypermarket retail store 108.

In-store product display 104 comprises product shelving on which multiple products 112 are displayed for selection by shoppers, e.g., by manual removal and placement of desired products 112 in a shopping trolley or shopping basket. Note that the term "product" herein means a particular type, brand, and/or size of merchandise, while individual instances of a product may be referred to as "product items." A plurality of identical product items clustered together in the product display 104 may therefore be described as comprising a single product 112.

A customer may employ the mobile phone 102 to automatically detect one or more target products 116. In one example embodiment, the mobile phone 102 may be used to provide, on a screen 120 of the phone 102, a graphical view in the example form of an augmented reality view 124 in which video content captured by a camera 215 (see FIG. 2) integrated in the phone 102 is augmented to pinpoint the one or more target products 116. The augmented reality view 124 may, for example, include a location indicator 128 with an on-screen location that coincides with respective on-screen limitations of the one or more target products 116. In the example embodiment shown in FIG. 1, the location indicator 128 comprises a user interface element in the form of a highlight box around each identified target product 116. In some embodiments, a single location indicator (e.g. a single highlight box) may indicate multiple product items of the target product 112, for example encompassing the multiple product items. In other embodiments, a separate location indicator may be provided coincident with each detected instance or item of the target product 116. In the example embodiment illustrated in FIG. 1, however, a single location indicator 128 is displayed around only one of a plurality of detected items of the target product 116.

The functionalities provided by the augmented reality view 124 enables a user to walk alongside the in-store product display 104, scanning the display 104 with the phone's camera 215, visually monitoring the phone screen 120 for indication of automated detection of the one or more target products 116 by on-screen presentation of the location indicator 128. In some embodiments, the phone 102 may generate an audible alert when a target product 116 is detected.

In other embodiments, the phone 102 may capture and display still images. e.g. digital photographs, instead of or in addition to augmented reality video content.

Automated detection or recognition of the one or more target products 116 may comprise processing image information captured by the camera 215 of phone 102, to recognize or identify a visual indicator uniquely identifying each of the one or more target products 116. Such a visual indicator may, for example, comprise a visual product code, such as a barcode 132, carried by product packaging. In such case, video content or other image information captured by the camera 215 may be processed to identify predefined barcodes 132 unique to the target products 116.

Instead, or in addition, the visual indicator(s) may comprise visual attributes of the product packaging 136, such as trade dress elements 140 unique to respective products 112. In such instances, digital image information captured by the phone 102 may be processed to identify, for example, a brand image, product image, brand name, product name, general packaging design layout, or the like, printed on the product packaging 136 and uniquely associated with the particular product 112.

In other embodiments, automatically detecting the one or more target products 116 may comprise capturing wireless identifier signals produced by the respective products 112, e.g. comprising a radio frequency identification (RFID) signals produced by respective RFID tags of the product 112. In such case, the phone 102 may include an RFID reader that may scan the in-store product display 104 at a closer distance than is the case when visual scanning is performed by use of the camera 215 of phone 102.

Recognition criteria on which augmented product detection is based (e.g., the above-described barcodes 132 or trade dress elements 140) may be provided to the phone 102 before shopping is commenced. The customer may, for example, provide textual input to identify the one or more target products 116. Based on the textual input, the product recognition criteria may be obtained from a product database associated with the store 108 (see FIG. 2). In one example, product recognition criteria may be provided over a publicly accessible network, such as the Internet, for example from a store website. Instead, or in addition, the phone 102 may communicate with a store computer system (see FIG. 2) to retrieve for access the necessary product recognition criteria for the one or more target products 116.

Instead of identifying the target products 116 by textual input (or in addition thereto), the customer may specify target products 116 through the use of the phone's camera 215, for example by scanning one or more barcodes 132 of the target products 116, and/or generating a search query that includes a search image in the form of a digital photograph of an item of each target product 116. For example, before going to the store 108, the customer may consult a booklet, brochure, website, or other literature that lists products available at the store 108 together with their respective barcodes 132, and may scan the barcodes 132 of the desired target products 116. Thereafter, the store 108, the target products 116 thus identified may automatically be detected by the phone 102 when the user scans the in-store product display 104 with the camera 215 of phone 102.

In some embodiments, processing of merchandise display data captured by the phone 102 (e.g., image information captured by the camera 215, or wireless signal information) may be processed at a separate processor with which the phone 102 is in communication, with results of the processing being communicated to the phone 102 for display to the shopper.

Features of Various Example Embodiments

As exemplified by the above-discussed example system and method, various embodiments may be realized. These include a method that comprises receiving merchandise display data captured by a portable electronic device at a store, the merchandise display data indicating physical presence of multiple products on a product display at the store in an automated operation using one or more processors, detecting a target product among the multiple products on the in-store product display based on the merchandise display data; displaying a graphical view of at least a part of the in-store product display on a screen of the portable electronic device; and providing as a part of the graphical view a location indicator that indicates an on-screen position of the target product.

To this end, an example product detection system comprises a receiver module to receive the merchandise display data, a product locator module to detect the target product, a display module to display the graphical view, and an indicator module to provide, in the graphical view, the location indicator coincident with the target product.

Display of the location indicator is not merely to communicate to a user of the portable electronic device that the target product is present in a targeted zone of the in-store product display, but it indicates the position of the target product on the in-store product display relative to the physical geometry of the in-store product display from the perspective of the portable electronic device, relative to other products visible in the graphical depiction, and/or relative to a field of view of a camera of the portable electronic device, such that no further visual searching for the product by a user of the portable electronic device is needed to pinpoint the target product among the multiple products on the in-store product display.

The merchandise display data may be captured by a customer carrying the portable electronic device (e.g., a mobile phone, a tablet PC, or wearable electronics such as smart glasses with camera and display capabilities, or the like) while the customer is at a store in which the product display is located.

In some embodiments, the receiver module comprises a data capturing arrangement provided by the portable electronic device to capture the merchandise display data originating from the in-store product display, for example by capturing one or more images of the product display, or by receiving RFID signals from respective products on the product display. The receiver module may be configured to capture the merchandise display data from within viewing proximity of the in-store product display, e.g., being at a distance from the product display such that different products on the product display are visually distinguishable.

Processing of the merchandise display data to locate the target product may be performed at the portable electronic device. Instead, or in addition, the merchandising display data may be communicated via a distributed network such as the Internet to a remote or off-site processor (e.g. an online server) that provides target product identification and/or location services to a multitude of portable electronic devices.

Detecting of the target product may thus in some embodiments comprise processing the merchandise display data onboard the portable electronic device to identify one or more product recognition criteria for the target product in the merchandise display data. In other embodiments, the system may be provided off-site, remote from the portable electronic device. In such embodiments, the receiver module may be configured to receive merchandise display data (e.g., captured image data or captured signal data) from the portable electronic device, the display module and the indicator module being configured to generate display data based on results of processing of the merchandise display data by the product locator module, and to transmit the display data to the portable electronic device to enable display of the graphical view together with the location indicator on the screen of the portable electronic device.

As previously described, some embodiments comprise capturing image information by use of an onboard camera of the portable electronic device, the image information representing an image of at least part of the in-store product display, to provide the merchandise display data. In such cases, the detecting of the target product may comprise processing the image information to recognize a visual indicator that is unique to the target product.

The visual indicator may comprise one or more trade dress elements of a packaging of the target product and/or a visual product code carried on the target product.

The method may comprise capturing video content at the portable electronic device, in which case providing the graphical view may comprise displaying a video image based on the captured video content, the video image showing at least part of the in-store product display substantially in real time together with the location indicator, to continuously indicate the on-screen position of the target product in the video image.

In some embodiments, capturing the merchandise display data may comprise receiving respective wireless identifier signals from the multiple products, the identifying of the product recognition criteria comprising identifying a particular one of the identifier signals as being a unique identifier signal of the target product.

One or more product recognition criteria that define one or more unique product attributes of the target product may be received at the portable electronic device, detection of the target product being based on the product recognition criteria. The unique attribute may comprise a product code that uniquely identifies the target product. The product code may be contained in the merchandise display data, for example as a scanned visual barcode, or as a code carried by a wireless signal, such as an RFID tag code. Instead, or in addition, the product recognition criteria may comprise definition of one or more visual characteristics or visual indicators, such as trade dress elements, that are uniquely associated with the target product.

The merchandise display data may include store mapping identifiers or tags that indicate an in-store position, and/or that may be uniquely mapped to a particular in-store location. RFID signals produced by or in association with respective products may, for example, include a location code that is uniquely associated with the particular display, for example being mapped to the particular display in mapping information under central administration by a store computer system. Instead, or in addition, visual location tags may be placed in the product display, in which case the particular location at which a digital photograph of a product display was taken can be established by processing the resultant image data to identify the unique visual location tag. In an example, the visual location tags may be color-coded and may be largely sized (relative, e.g., to product barcodes or visual product codes), to facilitate ready and accurate optical recognition of the location tags in digital photographs taken at a distance from the product display broadly similar to that at which a browsing shopper would typically view the product display.

A search query for the target product may be submitted by the customer (e.g., being transmitted to a store computer system), the product recognition criteria being received by the portable electronic device from the store computer system responsive to the search query.

In instances where a consumer has insufficient information on which to base automatic recognition of the target product (e.g., where recognition of the target product is to be performed with reference to a product code to which the consumer does not have immediate access) a search query may be submitted to the store computer system for processing of the search query to identify the target product in a product database forming part of the store computer system. One or more unique attributes of the target product may then be retrieved from the product database, and may be transmitted to the portable electronic device as the product recognition criteria. The search query may comprise textual search content and/or image content.

The consumer may thus, for example, take a picture of a sample product item of the target product or its packaging (e.g., a previously purchased product item) and may submit the search picture to the store computer system. In such case, the store computer system may perform an image-based search to identify the target product, to retrieve from its product database the one or more unique product attributes that may serve as the product recognition criteria. Such product recognition criteria lookup may not only facilitate automated in situ product recognition based on store-specific product codes (in which case the consumer need not concern herself with store-specific product information), but may also serve to promote ambulatory product searching based on up-to-date information.

For example, in instances where the unique product attribute is a visual indicator such as trade dress elements of the target product's packaging, consumer access (via the portable electronic device) to a product database of the store computer system may enable the consumer to perform automated searching for the target product based on a photograph of a sample target product item having outdated packaging, or that is in a size or volume that is not in stock in the store. Some embodiments of the system may thus provide for generation of search queries that comprise a search image, for example by use of the portable electronic device's camera.

The search image may thus in some instances define the one or more unique product attributes, so that, for example, a picture of a sample item of the target product taken with the portable electronic device's camera may serve as sufficient product recognition criteria. In other embodiments, the search image may be submitted to the store computer system for retrieval of product recognition criteria from the store's product database.

The search query may comprise a visual product code unique to the target product. In such cases, creation of the search query may be by scanning an instance of the visual product code by use of the onboard camera of the portable electronic device.

Multiple target products may simultaneously be the subject of automatic detection. In such cases, the one or more product recognition criteria for a shopping list comprise a plurality of target products. When a plurality of target products are in such instances simultaneously detected in a target zone captured by the camera, a respective location indicator for each of the plurality of target products that are identified may be provided in the graphical view.

Some embodiments may provide for automated cooperation between a home pantry system and the portable electronic device, to automatically create a shopping list and download the shopping list to the portable electronic device. The method may thus comprise receiving the one or more product recognition criteria for the shopping list from a home pantry system of a user of the portable electronic device.

Some example embodiments may therefore comprise monitoring stock levels of products in the home pantry system, determining that a stock level for a particular product in the home pantry system is below a threshold level, and automatically adding the particular product to the shopping list. The shopping list may be communicated from the home pantry system to the portable electronic device by transmission of the one or more product recognition criteria for the respective target products forming part of the shopping list. The home pantry system may be a computerized system that is configured to monitor and manage inventory or stock levels in the customer's home, and automatically to identify when stock of respective products is running low or is depleted and needs to be replenished. To this end, a processor of the home pantry system may be operatively coupled with one or more physical product storage devices, such as kitchen cupboards, a pantry, or a fridge, to automatically identify products that are to be added to the shopping list, and automatically to communicate the shopping list to the portable electronic device.

The home pantry system may, in some embodiments, retrieve product location information about their respective target products on the shopping list, the product location information indicating in-store locations of the respective target products, e.g. relative to a store map. The product location information may be employed together with store map information to make the location information of the respective products available to the consumer, e.g. on a screen of the portable electronic device.

Some embodiments may include automatic plotting of an in-store route, to map out a suggested route that passes the respective locations of each of the shopping list target products. Such automatic mapping functionality may facilitate efficient in-store movement of the consumer in order to gather all of the target product on the shopping list.

In some embodiments, the method is implemented by a portable electronic device that comprises a product detection module to generate an augmented reality display of multiple consumer products based on image data captured by a camera of the device, to detect a product of interest among the multiple consumer products, and to dynamically pinpoint product of interest in the augmented reality display. By "augmented reality display" is meant display of real-time video content captured by the portable electronic device's camera, the video content being augmented by one or more screen elements, such as the location indicator(s). While some embodiments of such an augmented reality display may be sensitive to the field of view of the user, so that the screen display is more or less seamlessly integrated with the surrounding background (thus effectively providing an "overlay" to the customer's perspective of the store environment in reality), the term "augmented reality" includes display of augmented real-time video content wherever the portable electronic device is pointed, regardless of the user's perspective. The portable electronic device may include, in other embodiments, a wearable display screen and integrated camera (e.g., a mobile phone device integrated in a pair of glasses), so that the graphical view comprises a heads-up display in which the one or more location indicators are overlaid on the user's view through transparent lenses of the wearable display screen.

It is a benefit of the example systems and methods that it facilitates in-store discovery of desired products by shoppers.

Example System

More specific examples of system elements and components by which the disclosed methods may be implemented will now be described. Note that the systems and system components described below serve to provide various functionalities mentioned both in the following description and elsewhere in this disclosure, and that, for clarity of description, the functionalities of the system components are not in all instances explicitly reiterated in the following description of the system components and elements.

For ease of reference, different environments of a particular system element may be indicated by identical reference numerals in different figures, so that an element indicated by the same reference numeral is not necessarily identical in all respects.

Figure 2:
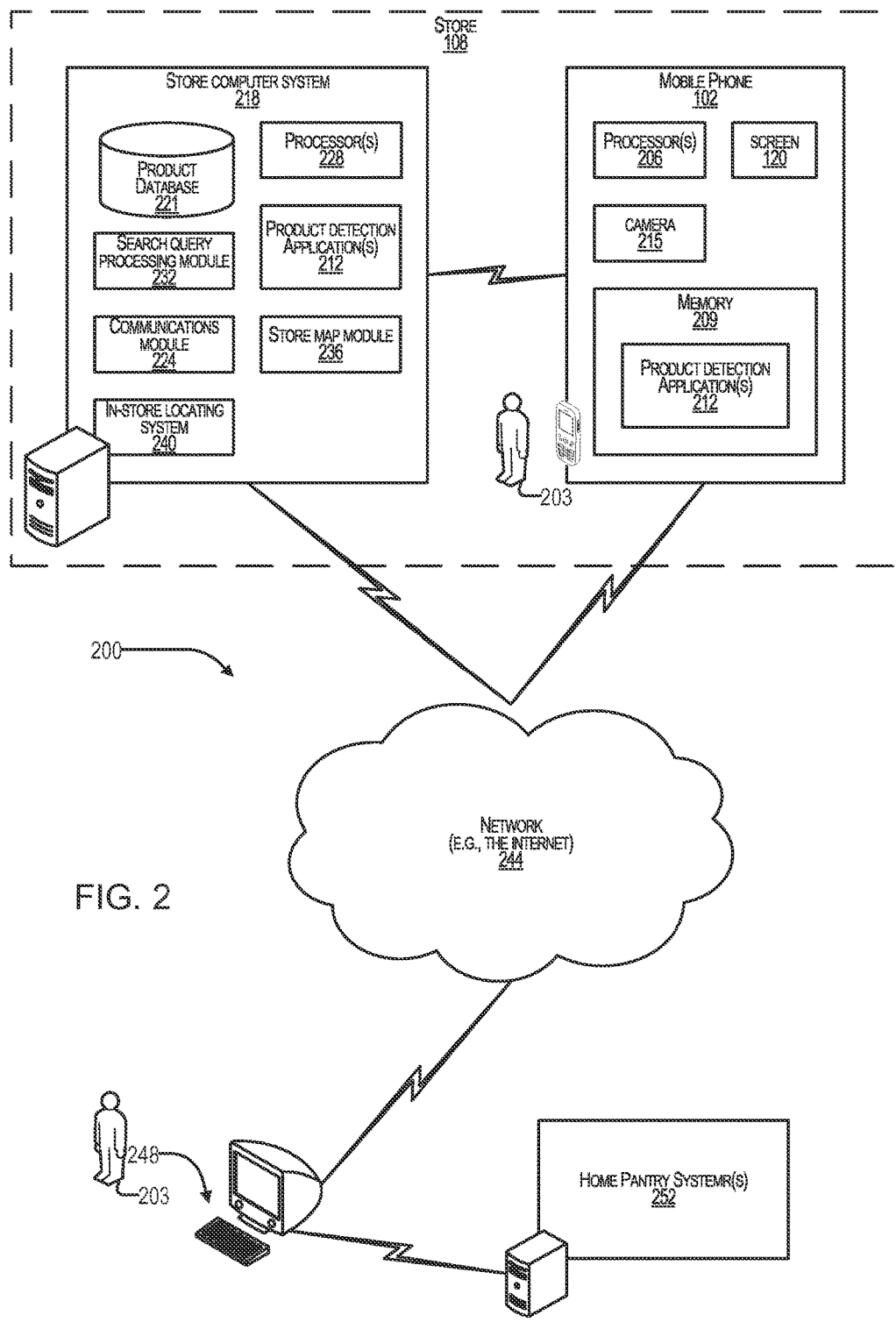
FIG. 2 is a schematic block diagram of an automated in-store product detection system, according to an example embodiment.

FIG. 2 is a block diagram depicting an example embodiment of a system 200 to facilitate in-store discovery of target products. The example system 200 includes a portable electronic device in the example form of a mobile phone 102 that may be carried on the person of a customer or shopper 203 at a retail store 108. The mobile phone 102 may include a processor 206 coupled to one or more memories 209 on which one or more mobile phone applications may be stored for execution by the processor 206. The mobile phone applications may include one or more product detection applications 212 that comprise instructions that enable the mobile phone 102 to perform the respective processes and/or operations disclosed herein, when the instructions are executed by the processor 206. The mobile phone 102 further comprises a camera 215 to capture image information, e.g., digital video and/or digital photographs. The mobile phone 102 also has a display screen 120.

Figure 3:
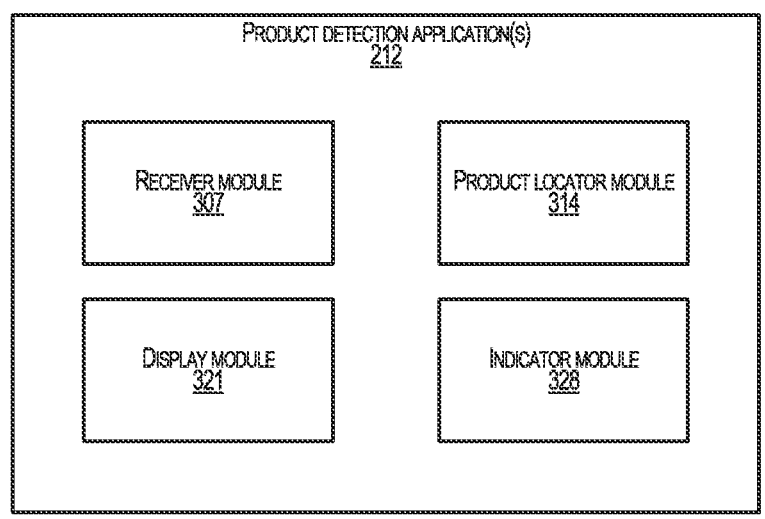
FIG. 3 is a schematic block diagram of one or more product detection application(s), in accordance with an example embodiment.

FIG. 3 is a block diagram schematically showing various example modules provided by the product detection application(s) 212 for implementing the disclosed method operations. A receiver module 307 may be provided to receive merchandise display data captured by the mobile phone 102, e.g. comprising video content of an in-store display 104 on which a target product 116 is situated. A product locator module 314 may be configured to detect one or more target products 116 among multiple products 112 that are present in a target zone of the in-store product display 104 and that are thus represented in the captured merchandise display data.

The product detection application(s) 212 further comprises a display module 321 to display a graphical view of the in-store product display 104 on the screen 120, and an indicator module 328 to provide a location indicator 128 (see FIG. 1) in the graphical view 124, thus indicating an on-screen position of the target product 116.

Returning now to FIG. 2, the store 108 may include a store computer system 218 with which the mobile phone 102 can communicate (either directly or indirectly) to submit search queries and/or to receive product-related data (e.g., product recognition criteria) responsive to such search queries. The store computer system 218 may therefore include a product database 221 holding information regarding the multiple products 112 that are in stock in the store 108. The product database 221 may include, for each product 112, product recognition criteria such as a visual product code, visual indicators on the product's packaging (e.g., a unique image on a cereal box, a unique rendering of a trade name, or the like). The store computer system 218 may include a communications module 224 for establishing a communication session with the mobile phone 102, e.g. by creating an in-store local area network (LAN) to which the mobile phone 102 is connectable.

The store computer system 218 has one or more processors 228, and may include a search query processing module 232 to process search queries submitted to the store computer system 218 by the mobile phone 102, e.g. to identify and provide product recognition criteria to the mobile phone 102 responsive to a search query, as described elsewhere herein.

The store computer system 218 may further comprise one or more product detection application(s) 212 (see FIG. 3) that may enable the processing of merchandise display data captured by the mobile phone 102 (e.g., digital video content) for detecting one or more target products 116. The product detection applications 212 of the store computer system 218 may be used for data processing remotely from customer portable electronic devices in instances where the electronic devices (e.g., the mobile phone 102) do not have sufficient processing capacity to parse, e.g., video information captured by the phone 102 substantially in real-time.

The store computer system 218 may further comprise a store map module 236 in which mapping information (e.g., a mini-map) about the layout of the retail store 108 and the location of respective products 112 are stored. This enables the store computer system 218, in some embodiments, to provide location information about the one or more target products 116 to the mobile phone 102, in which case the automated product detection by the mobile phone 102 may be performed based at least in part on location information that identifies one or more in-store positions or locations for the target product 116. The store computer system 218 may in such cases communicate with an in-store locating system 240 to monitor the position of the customer's mobile phone, thus enabling the determination by the store computer system 218 and/or the mobile phone 102 of the physical location of the mobile phone 102 relative to the target product 116 in the store 108. Note that although the store computer system 218 is illustrated in the example embodiment of FIG. 2 as having functionalities to process video data for optical product recognition, as well as the in-store locating system 240, the store computer system 218 may, in other embodiments, omit one or more of these functionalities.

The store computer system 218 may be connected to a customer-accessible network 244, such as the Internet, and may be configured to provide customer services to the shopper 203, for example by communication over the network 244 with the store computer system 218 via the shopper's mobile phone 102, home computer system 248, or the like. The shopper 203 may retrieve product information, such as product barcodes 132, distinctive visual attributes of products, or the like, from the product database 221 before leaving home. In one example, the shopper 203 may create a shopping list comprising multiple target products 116 by browsing a website provided by the store computer system 218, downloading product recognition criteria for each target product 116, and transferring the product recognition criteria to the mobile phone 102 for use in automated product detection at the store 108. In other embodiments, the store computer system 218 may be replaced with or augmented by a merchant computer system and/or website that provides the described functionalities to multiple stores 108 at different locations. One example embodiment of such a platform architecture is later described with reference to FIG. 4.

The system 200 may yet further include a home pantry system 252 to automatically monitor stock levels or product inventory at a residence of the shopper 203, and to automatically maintain a shopping list by adding at least some products 112 to the shopping list responsive to detecting that stock levels of those products 112 in the pantry of shopper 203 fall below a threshold level. The home pantry system 252 may thus include one or more smart or computer-enabled appliances and/or product storage devices having the functionality to monitor or keep track of its contents.

The home pantry system 252 may be configured automatically to communicate with the store computer system 218 or its equivalent(s), to obtain product recognition criteria (e.g., barcodes, optical product recognition attributes, etc.). The home pantry system 252 may automatically provide such product recognition criteria to the mobile phone 102 when the associated shopping list is created or downloaded. A benefit of such automatic product recognition criteria retrieval by the pantry system 252 is that shopper 203 need not explicitly search for or download product recognition criteria but can merely visit the store 108 and scan the in-store display 104 with the mobile phone 102, a target product 116 on the shopping list automatically being detected and pinpointed by the mobile phone 102.

Example Platform Architecture

Figure 4:
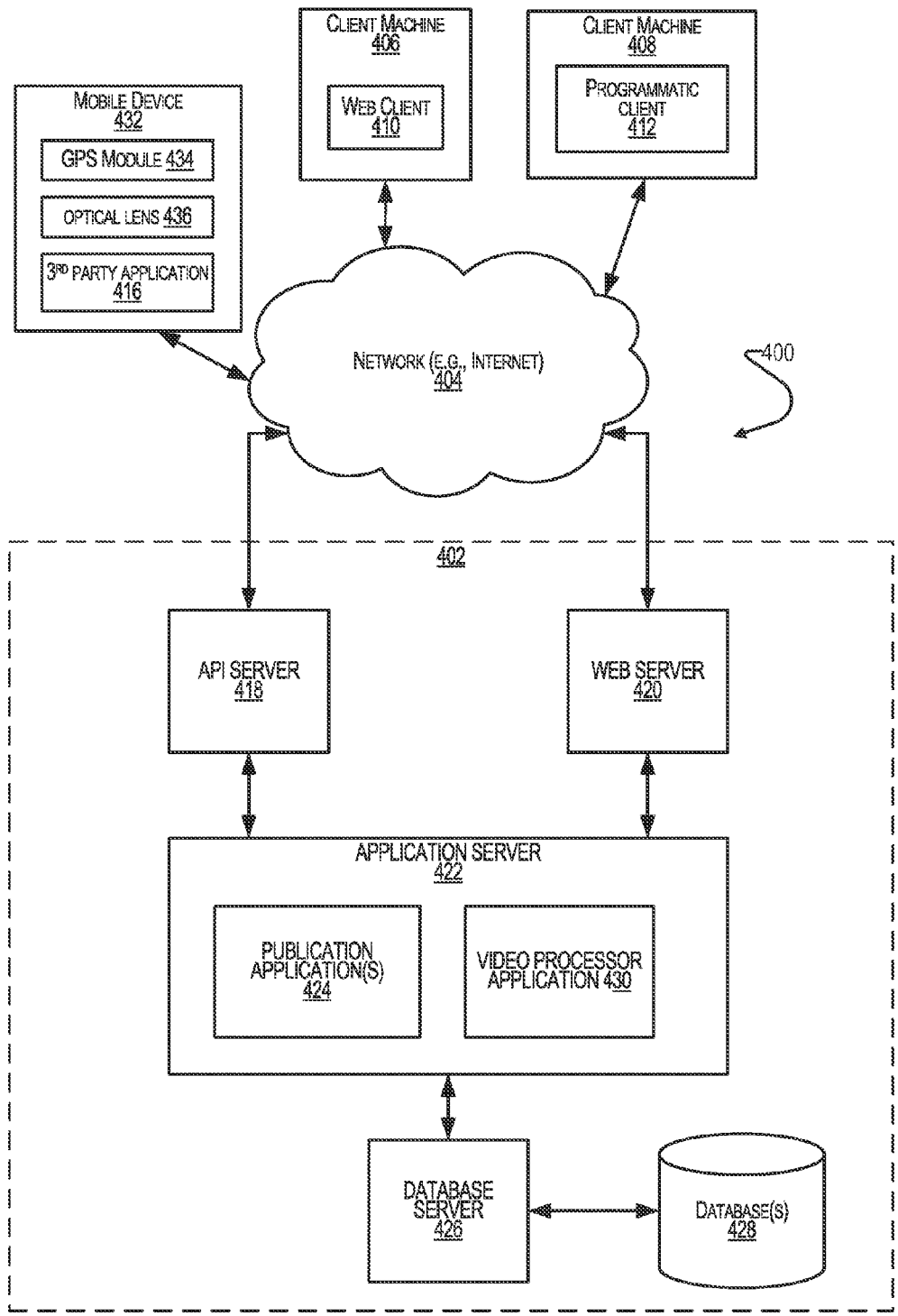
FIG. 4 is a schematic network diagram depicting a network system, according to one embodiment, having a client-server architecture configured for exchanging data over a network.

FIG. 4 is a network diagram depicting a network system 400, according to one embodiment, having a client-server architecture configured for exchanging data over a network. For example, the network system 400 may be a publication/publisher system where clients may communicate and exchange data within the network system 400. The data may pertain to various functions (e.g., online item purchases) and aspects (e.g., managing content and user reputation values) associated with the network system 400 and its users. Although illustrated herein as a client-server architecture as an example, other embodiments may include other network architectures, such as a peer-to-peer or distributed network environment.

A data exchange platform, in an example form of a network-based publisher 402, may provide server-side functionality, via a network 404 (e.g., the Internet) to one or more clients. The one or more clients may include users that utilize the network system 400 and more specifically, the network-based publisher 402, to exchange data over the network 404. These transactions may include transmitting, receiving (i.e., communicating) and processing data to, from, and regarding content and users of the network system 400. The data may include, but are not limited to, content and user data such as feedback data; user reputation values; user profiles; user attributes product and service reviews; product, service, manufacture, and vendor recommendations and identifiers; product and service listings associated with buyers and sellers; auction bids; and transaction data, among other things.

In various embodiments, the data exchanges within the network system 400 may be dependent upon user-selected functions available through one or more client or user interfaces (UIs). The UIs may be associated with a client machine, such as a client machine 406 using a web client 410. The web client 410 may be in communication with the network-based publisher 402 via a web server 420. The UIs may also be associated with a client machine 408 using a programmatic client 412, such as a client application, or a third party server hosting a third party application. It can be appreciated that in various embodiments the client machine 406, 408, or third party application may be associated with a buyer, a seller, a third party electronic commerce platform, a payment service provider, or a shipping service provider, each in communication with the network-based publisher 402 and optionally each other. The buyers and sellers may be any one of individuals, merchants, or service providers, among other things.

A mobile device 432 may also be in communication with the network-based publisher 402 via a web server 420. The mobile device 432 may include a portable electronic device providing at least some of the functionalities of the client machines 406 and 408. The mobile device 432 may include a third party application 416 (or a web client) configured to communicate with application server 422. In one embodiment, the mobile device 432 includes a GPS module 434 and an optical lens 436. The GPS module 434 is configured to determine a global location of the mobile device 432, for example with reference to global positioning satellites.

In some embodiments, the mobile device 432 may include hardware and/or software to provide positioning services at a more granular level than is the case with typical GPSs. The device 432 may, for example, include an indoor positioning system (IPS) or a real-time locating system (RTLS) to determine the indoor location of the device. Such an IPS may function to wirelessly establish the position of the device 432 inside a store building. Instead of using satellites, such an IPS may rely on nearby anchors (e.g., nodes with a known position), which effectively locate tags or provide environmental context for devices to sense. Example IPSs operate by the use of optical signals, radio signals, acoustic (typically high-frequency) signals, or combinations thereof.

The optical lens 436 enables the mobile device 432 to take pictures and videos.

Turning specifically to the network-based publisher 402, an application program interface (API) server 418 and a web server 420 are coupled to and provide programmatic and web interfaces respectively to, one or more application servers 422. The application servers 422 host one or more publication application(s) 424 and video processor application(s) 430. The application servers 422 are, in turn, shown to be coupled to one or more database server(s) 426 that facilitate access to one or more database(s) 428.

In one embodiment, the web server 420 and the API server 418 communicate and receive data pertaining to listings, transactions, and feedback, among other things, via various user input tools. For example, the web server 420 may send and receive data to and from a toolbar or webpage on a browser application (e.g., web client 410) operating on a client machine (e.g., client machine 406). The API server 418 may send and receive data to and from an application (e.g., programmatic client 412 or third party application 416) running on another client machine (e.g., client machine 408 or third party server 414).

Publication application(s) 424 may provide a number of functions and services (e.g., listing, payment, store inventory, product querying, product recognition criteria provision, automated product detection, etc.) to users that access the network-based publisher 402. For example, the application(s) 424 may provide a number of services and functions to users for listing goods and/or services for sale, facilitating transactions, and reviewing and providing feedback about transactions and associated users. Additionally, the application(s) 424 may track and store data and metadata relating to listings, transactions, and user interaction with the network-based publisher 402. The application(s) 424 may also provide automated product detection application(s) 206 as described, to deliver associated functionalities to a user, and may in some embodiments provide the functionalities described with reference to the store computer system 218 in FIG. 2.

FIG. 4 also illustrates a third party application that may execute on a third party server 414 and may have programmatic access to the network-based publisher 402 via the programmatic interface provided by the API server 418. For example, the third party application 416 may use information retrieved from the network-based publisher 402 to support one or more features or functions on a website hosted by the third party.

Example Mobile Device

Figure 5:
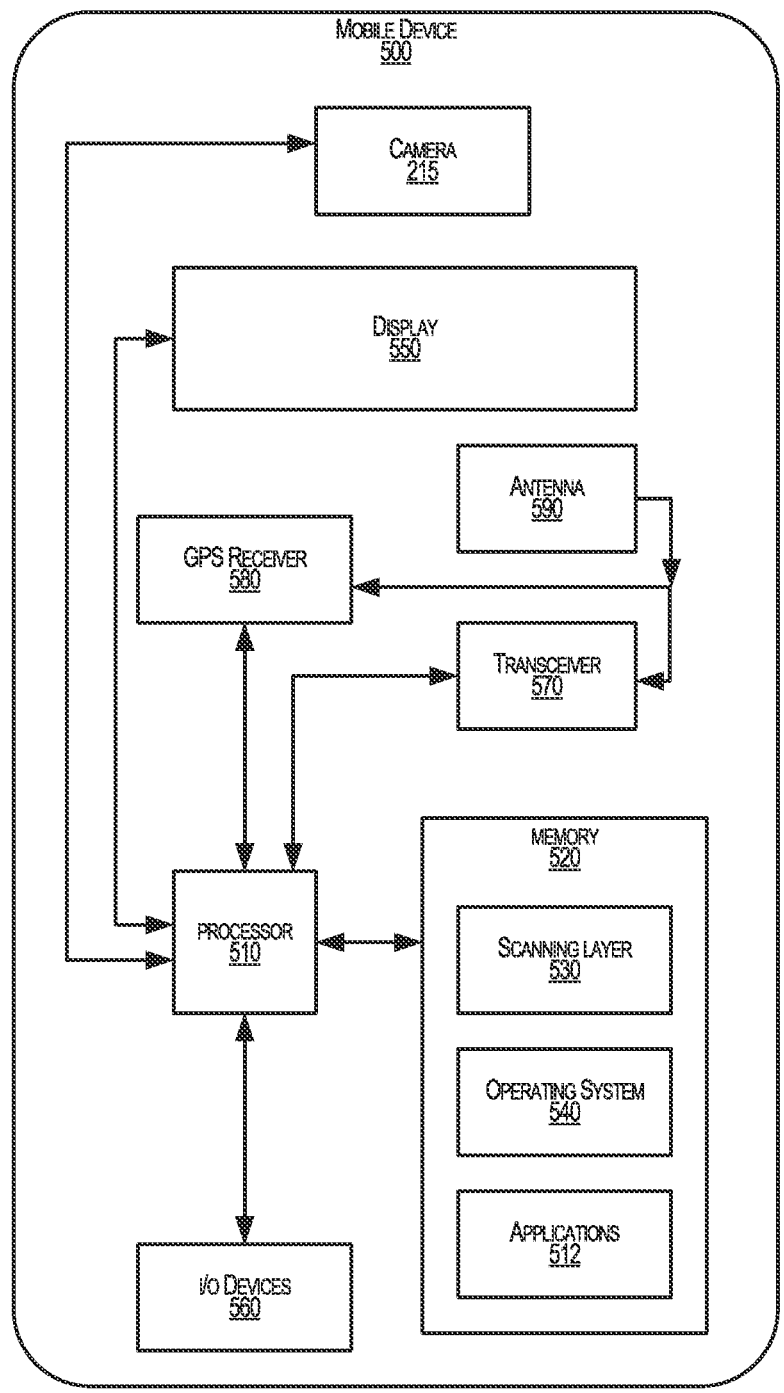
FIG. 5 is a schematic block diagram of a mobile device configured to provide automated in-store product detection, according to another example embodiment.

FIG. 5 is a block diagram illustrating a further example embodiment of a mobile device 500 that may be employed to provide the functionalities described, e.g., with reference to a mobile phone 102 (see FIGS. 1 and 2). According to an example embodiment, the mobile device 500 may include a processor 510 and has an image capture device in the form of a camera 215 that can capture both digital photos and/or digital video content. The processor 510 may be any of a variety of different types of commercially available processors suitable for mobile devices (for example, an XScale architecture microprocessor, a Microprocessor without Interlocked Pipeline Stages (MIPS) architecture processor, or another type of processor). A memory 520, such as a Random Access Memory (RAM), a Flash memory, or other type of memory, is typically accessible to the processor 510. The memory 520 may be adapted to store an operating system (OS) 540, as well as application programs 512, such as the above-discussed in-store product detection application(s) 206, and a location enabled application that may provide LBSs to a shopper. A scanning layer 530 may be provided for scanning visual codes based on image information capture via the camera 215. The processor 510 may be coupled, either directly or via appropriate intermediary hardware, to a display 550 and to one or more input/output (I/O) devices 560, such as a keypad, a touch panel sensor, a microphone, and the like. Similarly, in some embodiments, the processor 510 may be coupled to a transceiver 570 that interfaces with an antenna 590. The transceiver 570 may be configured to both transmit and receive cellular network signals, wireless data signals, or other types of signals via the antenna 590, depending on the nature of the mobile device 500. In this manner, a connection with the communication network 244 may be established. Further, in some configurations, a GPS receiver 580 max also make use of the antenna 590 to receive GPS signals.

Example Methods

Figure 6:
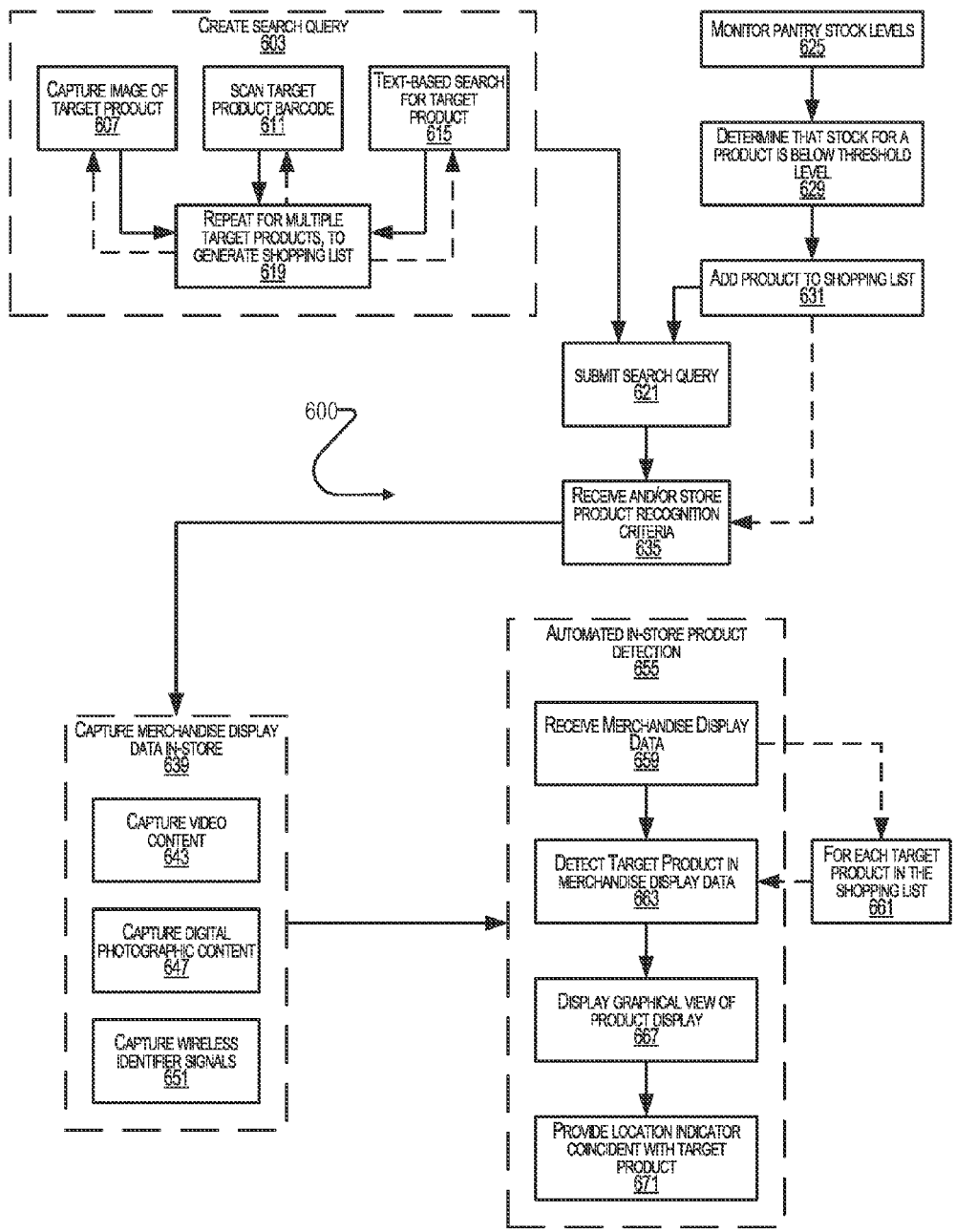
FIG. 6 is a flow diagram of an example method for automated in-store product detection.

FIG. 6 is a schematic flow chart that illustrates an example method 600 for automated in-store product detection.

The method 600 may comprise creating a search query, at operation 603, for one or more target products 116; submitting the search query, at operation 621, to the store computer system 218 or an equivalent online website; and receiving product recognition criteria, at operation 635, responsive to the search query.

The product recognition criteria thus retrieved may be stored on the mobile phone 102 (see FIG. 2).

Thereafter, when visiting the brick-and-mortar store 108, the shopper 203 may capture merchandise display data, at operation 639, of the in-store product display 104 (see FIG. 1). The merchandise display data thus captured may then be used in combination with the previously retrieved product recognition criteria for automated in-store product detection, at operation 655, which may include alerting the shopper 203 to the particular location of one or more of the target products 116 by displaying a location indicator 128 (FIG. 1) on the phone's screen 120.

Creation of the search query, at operation 603, may be performed either at a location remote from the store 108 (e.g., that the shopper's home computer system 248), or may be performed while the shopper 203 is in the store 108. In the latter instance, the creation and submission of the search query may be by establishing communication between the mobile phone 102 and the store computer system 218.

The search query may be created by capturing one or more images of each target product 116, at operation 607. This may comprise taking a digital photograph of a sample item (e.g., an empty cereal box or previously purchased product item, at home), or may be by taking a picture of a two-dimensional representation of the product (e.g., a magazine or brochure picture).

Instead, or in addition, one or more target products 116 may be included in the search query by scanning the associated product bar code, at operation 611. Again, this may comprise scanning a barcode 132 on a sample product item, or scanning a barcode or other visual code separate from a product item (e.g., in a magazine, coupon, or the like). Yet further, desired target products 116 may be included in the search query by user-provision of text input, at operation 615.

If a shopping list comprising multiple target products 116 is to be created, then the search query input is repeated, at operation 619, for each respective target product 116.

The search query may be submitted (at operation 621) to the store computer system 218 or to a merchant or store website, at which a product database (e.g., 221) may be accessed to retrieve product recognition criteria for the target products 116 in the search query. In some instances, creation of the shopping list may be by online browsing of a website that allows search and selection of desired target products 116.

Instead of user-creation of a shopping list, or in addition thereto, one or more target products 116 may automatically be added to the shopping list, e.g., by a home pantry system 252 (see FIG. 2). The pantry system 252 may thus monitor pantry stock levels, at operation 625, for multiple respective products, and may automatically add one or more products to the shopping list as target products, at operation 631, responsive to determining, at operation 629, that stock levels have fallen below a predetermined threshold. In some examples, target products 116 may also be automatically included in the shopping list at the store 108 (e.g., by the store computer system 218) based on predefined criteria. The shopper 203 may, e.g., register to automatically be alerted to products that are available at a special deal, for example being priced more than a certain percentage less than usual.

Capturing of the merchandise display data at the store 108 by use of the mobile phone 102 (at operation 639), may be by capturing video content, at operation 643; capturing digital photographs, at operation 647; or capturing identifier signals (e.g., RFID signals) of a target zone of the in-store product display 104, at operation 651.

As mentioned before, the automated product detection, at operation 655, may be performed on the mobile phone 102 or, in some embodiments, remotely from the phone 102. This comprises receiving the captured merchandise display data, at operation 659, and processing or parsing the merchandise display data, at operation 663, to detect a particular target product 116 indicated by the merchandise display data. In instances where the shopper 203 has created a shopping list with a plurality of target products 116, the merchandise display data may be processed, at operation 661, for detecting any or each of the respective target products 116 in the shopping list. Two or more target products 116 may thus be recognized and indicated at any particular moment.

A graphical view of the portion of the in-store product display 104 captured by the merchandise display data (e.g., an augmented reality view 124 such as that shown in FIG. 1) may be displayed on the screen 120 of the mobile phone 102, at operation 667.

Displaying a graphical view may include, at operation 671, providing respective location indicators 128 (see FIG. 1) for each target product 116 that is identified and that is present in the target zone currently displayed on the screen 120.

It is a benefit of the above-described method that it promotes ready user-discovery of a desired product in a store environment, with minimal user effort. Automatic shopping list creation may further facilitate pantry stock level management and, to the benefit of merchants, promote regular stock replenishment.

Components, and Logic of Example Embodiments

Certain embodiments are described herein as including logic or a number of components, modules, or mechanisms. Modules may constitute either software modules, with code embodied on a non-transitory machine-readable medium (i.e., such as any conventional storage device, such as volatile or non-volatile memory, disk drives or solid state storage devices (SSDs), etc.), or hardware-implemented modules. A hardware-implemented module is a tangible unit capable of performing certain operations and may be configured or arranged in a certain manner. In example embodiments, one or more computer systems (e.g. a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry or in temporarily configured circuitry (e.g., configured by software), may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).

Figure 7:
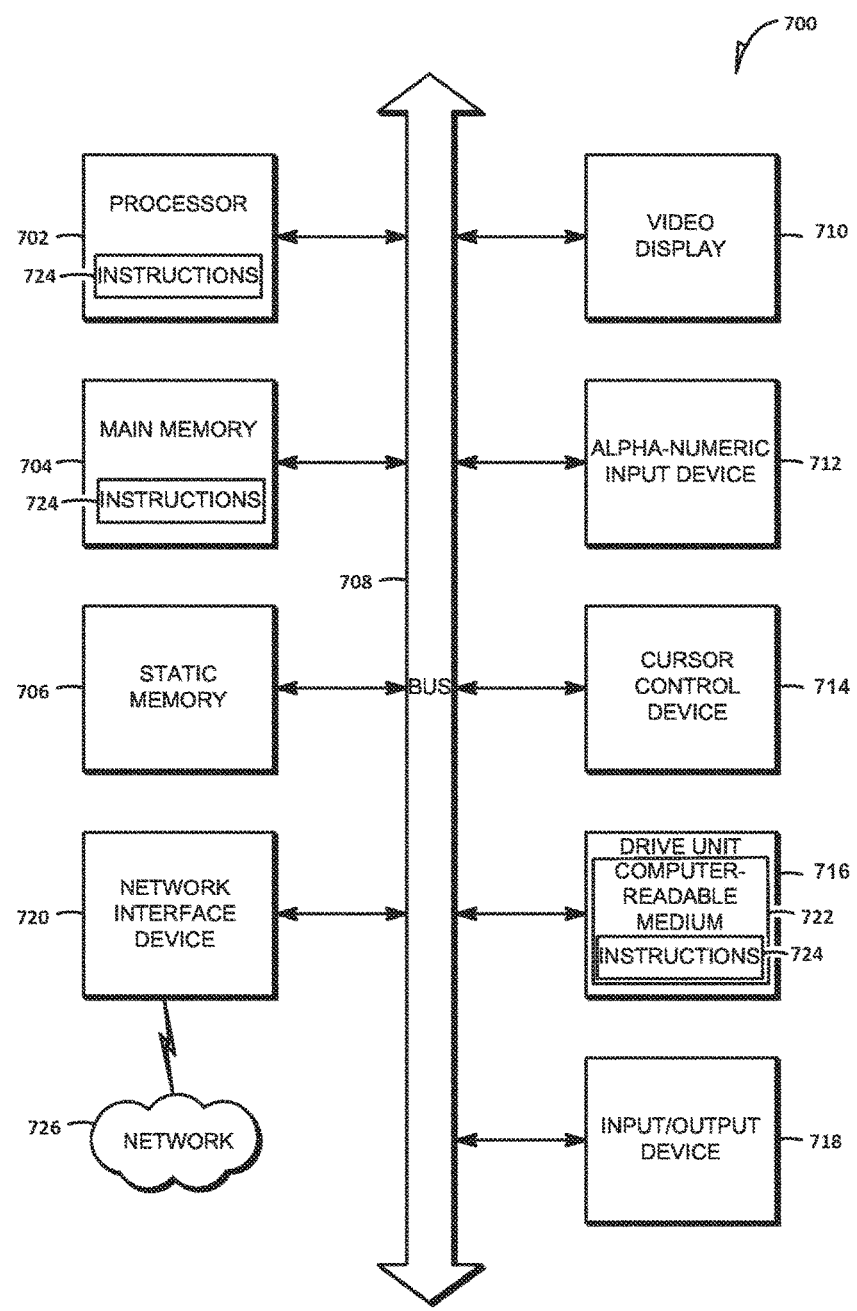
FIG. 7 shows a diagrammatic representation of machine in the example form of a computer system within which a set of instructions may be executed to cause the machine to perform any one or more of the methodologies discussed herein.

FIG. 7 shows a diagrammatic representation of a machine in the example form of a computer system 700 within which there may be executed a set of instructions 724 for causing the machine to perform any one or more of the methodologies discussed herein. For example, the system 100 (FIG. 1) or any one or more of its components (FIGS. 1 and 2) may be provided by the system 700.

In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alpha-numeric input device 712 (e.g. a keyboard), a cursor control device 714 (e.g., a mouse), a disk drive unit 716, an audio/video signal input/output device 718 (e.g., a microphone/speaker) and a network interface device 720.

The disk drive unit 716 includes a machine-readable storage medium 722 on which is stored one or more sets of instructions 724 (e.g., software) embodying any one or more of the methodologies or functions described herein. The instructions 724 may also reside, completely or at least partially, within the main memory 704 and/or within the processor 702 during execution thereof by the computer system 700, the main memory 704 and the processor 702 also constituting non-transitory machine-readable media.

The instructions 724 may further be transmitted or received over a network 726 via the network interface device 720.

While the machine-readable storage medium 722 is shown in an example embodiment to be a single medium, the term "machine-readable medium" should be taken to include a single medium or multiple media (e.g. a centralized or distributed database and/or associated caches and servers) that store the one or more sets of instructions 724. The term "machine-readable medium" shall also be taken to include any medium that is capable of storing a set of instructions for execution by the machine and that cause the machine to perform any one or more of the methodologies of this disclosure. The term "machine-readable medium" shall accordingly be taken to include, but not be limited to, solid-state memory devices of all types, as well as optical and magnetic media.

Thus, systems and methods for in-store product detection are disclosed. Although these methods and systems have been described with reference to specific example embodiments, it will be evident that various modifications and changes may be made to these embodiments without departing from the broader spirit and scope thereof. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, the disclosed subject matter lies in less than all features of a single disclosed embodiment. Thus, the following claims are hereby incorporated into the Detailed Description, with each claim standing on its own as a separate embodiment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

What is claimed is:

1. A method comprising:
receiving target definition data indicating a shopping list comprising a plurality of target products;
receiving an in-store route that passes at least one of the plurality of target products;
receiving merchandise display data captured by a portable electronic device at a store based on the portable electronic device traversing the in-store route, the merchandise display data indicating physical presence of multiple products on an in-store product display at the store, the merchandise display data including video content of the in-store product display at the store and wireless identifier signals from the multiple products, the wireless identifier signals including location data for at least one of the multiple products;
in an automated operation that is based at least in part on the merchandise display data and that is performed using one or more processor devices configured to perform the automated operation, detecting among the multiple products on the in-store product display a target product forming part of the plurality of target products, the target product detected based on a particular wireless identifier signal of the wireless identifier signals being a unique identifier signal of the target product;
displaying, substantially in real time based on a graphical view of at least a part of the in-store product display being captured by the portable electronic device, an augmented reality video image based on the graphical view, the graphical view including a depiction of a store area where the target product is located;
determining an on-screen position, among the multiple products, of the target product within the graphical view based on particular location data of the particular wireless identifier signal without receiving user input identifying the on-screen position of the target product and while continuing to receive the merchandise display data; and
providing as a part of the graphical view a location indicator that indicates the determined on-screen position, among the multiple products, of the automatically detected target product substantially in real time and in the augmented reality video image.

2. The method of claim 1, wherein the detecting of the target product comprises processing the merchandise display data to identify one or more product recognition criteria for the target product in the merchandise display data.

3. The method of claim 2, further comprising capturing image information by use of an onboard camera of the portable electronic device to provide the merchandise display data, the image information representing an image of at least part of the in-store product display and being included in the video content.

4. The method of claim 3, wherein the detecting of the target product comprises processing the image information to recognize a visual indicator that is unique to the target product.

5. The method of claim 4, wherein the visual indicator comprises one or more trade dress elements of a packaging of the target product.

6. The method of claim 4, wherein the visual indicator comprises a visual product code carried on the target product.

7. The method of claim 3, wherein the location indicator is displayed continuously while the automatically detected target product is visible in the video image.

8. The method of claim 3, further comprising receiving at the portable electronic device the one or more product recognition criteria that define one or more unique product attributes of the target product.

9. The method of claim 8, further comprising transmitting to a store computer system a search query for the target product, the product recognition criteria being received by the portable electronic device from the store computer system responsive to the search query.

10. The method of claim 9, wherein the search query comprises a search image, the method further comprising capturing the search image by use of the onboard camera of the portable electronic device.

11. The method of claim 10, wherein the search query comprises a visual product code unique to the target product, the method further comprising scanning an instance of the visual product code by use of the onboard camera of the portable electronic device.

12. The method of claim 2, wherein the processing of the merchandise display data is to identify any of the plurality of target products in the shopping list, and wherein the method further comprises providing as part of the graphical view a respective location indicator for each of the plurality of target products that are identified.

13. The method of claim 12, further comprising receiving the one or more product recognition criteria for the shopping list from a home pantry system of a user of the portable electronic device.

14. The method of claim 13, further comprising:
monitoring stock levels of products in the home pantry system;
determining that a stock level for a particular product in the home pantry system is below a threshold level;
responsive to the determination, automatically adding the particular product to the shopping list; and
communicating the shopping list to the portable electronic device from the home pantry system by transmitting the one or more product recognition criteria for the respective target products forming part of the shopping list.

15. A system comprising:
a receiver module to receive:
target definition data indicating a shopping list comprising a plurality of target products;
an in-store route that passes at least one of the target products; and
merchandise display data captured by a portable electronic device at a store along the in-store route, the merchandise display data indicating physical presence of multiple products on an in-store product display at the store, the merchandise display data including video content of the in-store product display at the store and wireless identifier signals from the multiple products, the wireless identifier signals including location data for at least one of the multiple products;
a product locator module comprising one or more computer devices configured to automatically detect, based at least in part on the merchandise display data, among the multiple products on the in-store product display a target product forming part of the plurality of target products, the target product detected based on a particular wireless identifier signal of the wireless identifier signals being a unique identifier signal of the target product;

a display module to display, substantially in real time based on a graphical view of at least a part of the in-store product display being captured by the portable electronic device, an augmented reality video image based on the graphical view, the graphical view including a depiction of a store area where the target product is located; and an indicator module comprising at least one computer processor device configured to:

determine an on-screen position, among the multiple products, of the target product within the graphical view based on particular location data of the particular wireless identifier signal without the system having received any user input that identifies the on-screen position of the target product and while the receiver module continues to receive the merchandise display data;

provide in the graphical view a location indicator that indicates the determined on-screen position, among the multiple products, of the automatically detected target product substantially in real time and in the augmented reality video image.

16. The system of claim 15, wherein the product locator module is configured to process the merchandise display data to identify one or more product recognition criteria for the target product in the merchandise display data.

17. The system of claim 16, wherein the product locator module is configured to process image information captured with an onboard camera of the portable electronic device, the video content including the image information and the image information including one or more images of the in-store product display.

18. The system of claim 17, wherein the product locator module is configured to detect the target product by processing the image information to recognize a visual indicator that is unique to the target product.

19. The system of claim 18, wherein the product locator module is configured to recognize one or more trade dress elements of a packaging of the target product.

20. The system of claim 18, wherein the product locator module is configured to recognize a visual product code carried on the target product.

21. The system of claim 17, wherein the indicator module is configured to dynamically adapt an on-screen position of the location indicator to coincide with the on-screen position of the target product.

22. A non-transitory machine-readable storage medium storing instructions which, in response to being executed by one or more processors of a system, cause the system to perform operations comprising:

receiving target definition data indicating a shopping list comprising a plurality of target products;

receiving an in-store route that passes at least one of the plurality of target products;

receiving merchandise display data captured by a portable electronic device at a store along the in-store route, the merchandise display data indicating physical presence of multiple products on an in-store product display at the store, the merchandise display data including video content of the in-store product display at the store and wireless identifier signals from the multiple products, the wireless identifier signals including location data for at least one of the multiple products;

based at least in part on the merchandise display data, detecting among the multiple products on the in-store product display a target product forming part of the plurality of target products while the portable electronic device is moved along the in-store route, the target product detected based on a particular wireless identifier signal of the wireless identifier signals being a unique identifier signal of the target product;

displaying, substantially in real time based on a graphical view of at least a part of the in-store product display being captured by the portable electronic device, an augmented reality video image based on the graphical view, the graphical view including a depiction of a store area where the target product is located;

determining an on-screen position, among the multiple products, of the target product within the graphical view based on particular location data of the particular wireless identifier signal without receiving user input identifying the on-screen position of the target product and while continuing to receive the merchandise display; and providing as a part of the graphical view a location indicator that indicates the determined on-screen position, among the multiple products, of the automatically detected target product substantially in real time and in the augmented reality video image.

* * * * *